(12) United States Patent
Pye et al.

(10) Patent No.: US 12,006,972 B2
(45) Date of Patent: Jun. 11, 2024

(54) COMPLIANT FOIL RADIAL BEARING

(71) Applicant: BLADON JETS HOLDINGS LIMITED, Castletown (IM)

(72) Inventors: Stephen Pye, Warwick (GB); Vasudeva Nimma, Warwick (GB); Phillip Heward, Warwick (GB)

(73) Assignee: BLADON JETS HOLDINGS LIMITED, Castletown (IM)

( * ) Notice: Subject to any disclaimer, the term of this patent is extended or adjusted under 35 U.S.C. 154(b) by 53 days.

(21) Appl. No.: 17/440,608

(22) PCT Filed: Mar. 22, 2019

(86) PCT No.: PCT/EP2019/057313
§ 371 (c)(1),
(2) Date: Sep. 17, 2021

(87) PCT Pub. No.: WO2020/192874
PCT Pub. Date: Oct. 1, 2020

(65) Prior Publication Data
US 2022/0186774 A1    Jun. 16, 2022

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01); *F16C 2300/22* (2013.01); *F16C 2300/54* (2013.01); *F16C 2360/23* (2013.01)

(58) Field of Classification Search
CPC ..................................................... F16C 17/024
See application file for complete search history.

(56) References Cited

U.S. PATENT DOCUMENTS

| 4,262,975 | A | 4/1981 | Heshmat |
| 5,228,785 | A | 7/1993 | Saville et al. |
| 5,427,455 | A | 6/1995 | Bosley |
| 8,944,688 | B2 * | 2/2015 | Omori ..................... F16C 32/06 384/106 |
| 2013/0216167 | A1 | 8/2013 | Flora et al. |
| 2014/0219590 | A1 | 8/2014 | Omori et al. |

FOREIGN PATENT DOCUMENTS

| CN | 101709747 A | 5/2010 |
| CN | 102797746 A | 11/2012 |
| EP | 0021711 A1 | 1/1981 |
| JP | 60175914 U | 11/1985 |
| JP | 2009185857 A | 8/2009 |
| WO | 2014014036 A1 | 1/2014 |
| WO | WO2015/026655 | * | 2/2015 |
| WO | WO2019/017134 | * | 1/2019 |

* cited by examiner

*Primary Examiner* — James Pilkington
(74) *Attorney, Agent, or Firm* — Rahman LLC (57) ABSTRACT

A compliant foil radial bearing (100) comprising: a bushing (110) comprising a bore defined therethrough; a spring foil (120, 130) arranged to conform to a radially inner surface of the bore; a fluid foil (140, 150) arranged to conform to a radially inner surface of the spring foil for rotatably receiving a rotor, wherein: the spring foil comprises one or more retaining portions (160) arranged to extend axially and radially outside the radially inner surface of the bore.

19 Claims, 7 Drawing Sheets

COMPLIANT FOIL RADIAL BEARING

CROSS-REFERENCE TO RELATED APPLICATIONS

This application is a U.S. National Stage entry of International Application No. PCT/EP2019/057313 filed Mar. 22, 2019, which is herein incorporated by reference in its entirety for all purposes.

TECHNICAL FIELD

The subject matter disclosed herein relates generally to compliant foil radial bearings.

BACKGROUND

Micro turbines may be utilized in distributed energy resources and may employ a compressor, combustor, turbine and electric generator thereby to convert fuel into a local source of electric power. Their small footprint, high rotational speeds and high operating temperatures render traditional bearings, such as oil-based hydrostatic bearings, impractical.

Compliant fluid foil radial bearings utilize: a bushing; a compliant spring foil that conforms to the inner surface of the bushing; and a fluid top foil that conforms to the inner surface of the compliant spring foil, the inner surface of the fluid top foil for receiving a rotor.

Prior to spin-up, gravitational forces acting on the rotor compress the fluid foil and spring foil between the rotor and inner surface of the bushing. Following spin-up, the creation of a thin layer of fluid between the non-rotating fluid foil and the rotating rotor results in the rotor, as it were, lifting off from the fluid foil, giving rise to a low friction hydrodynamic bearing, and, additionally, the transfer of fluid facilitates heat transfer.

Compliant fluid foil radial bearings may therefore be employed in micro turbines to combat the impracticalities associated with other traditional forms of radial bearing given the high rotational speeds and operating temperatures.

Existing fluid foil bearing designs generally employ a corrugated spring foil and fastening mechanism between the spring foil and bushing resulting in excessive manufacturing complexity. Furthermore, the effectiveness at low revolutions per minute of such existing designs is sufficiently poor that excessive bearing wear is introduced during spin-up and even during post spin-up normal operation. The performances of such existing designs is overly dependent upon the manufacturing specifics associated with the spring foil. Finally, the scope for optimization of the friction characteristics of these existing designs is limited.

It is therefore desirable to provide a fluid foil bearing resolving one or more of the above-described deficiencies in existing designs.

BRIEF DESCRIPTION OF THE DRAWINGS

Disclosed arrangements are further described hereinafter by way of example and with reference to the accompanying drawings, in which.

DETAILED DESCRIPTION

Figure 1:
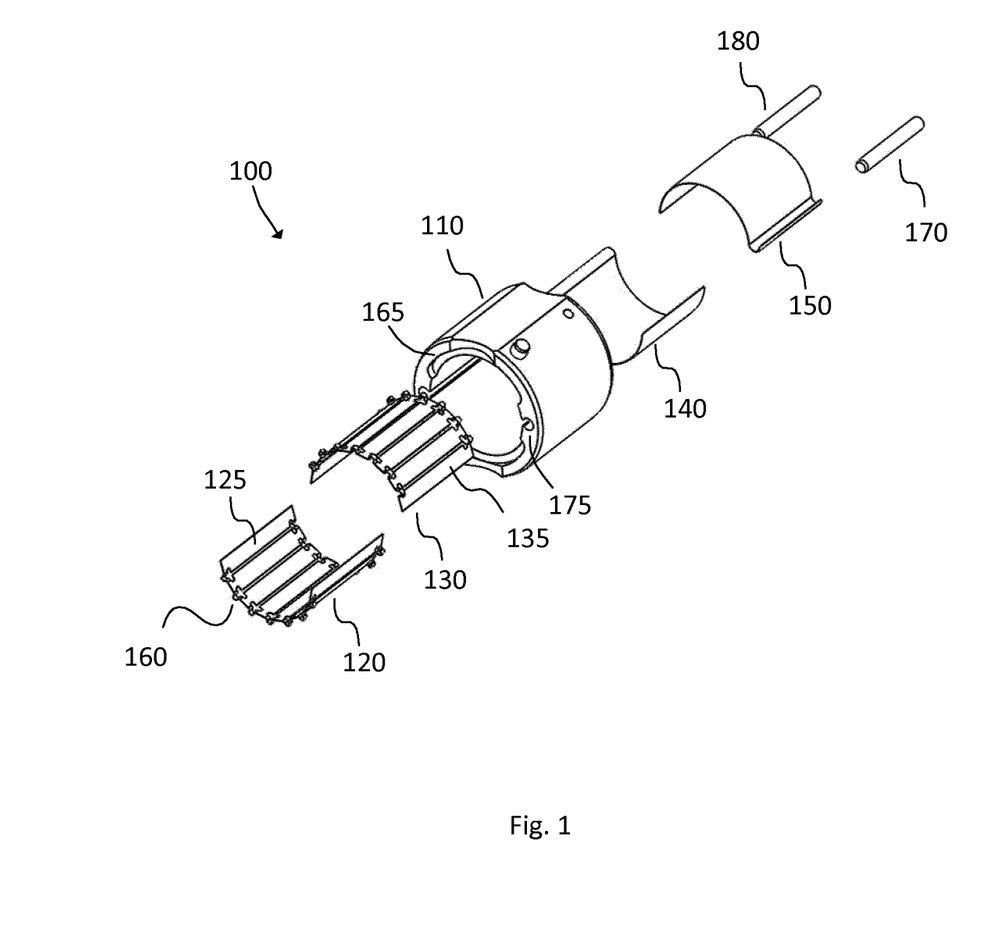
FIG. 1 depicts an example of a compliant foil radial bearing in an exploded perspective view.

FIG. 1 depicts an example of a compliant foil radial bearing 100 comprising a bushing 110 comprising a bore defined therethrough, a spring foil 120, 130 arranged to conform to a radially inner surface of the bore, a fluid foil 140, 150 arranged to conform to a radially inner surface of the spring foil for rotatably receiving a rotor, wherein the spring foil 120, 130 comprises one or more retaining portions 160 arranged to extend axially and radially outside the inner surface of the bore.

In the example of FIG. 1, the spring foil comprises first 120 and second 130 spring foil segments. Likewise the fluid foil comprises first 140 and second 150 fluid foil segments. This arrangement is commensurate with a two lobe radial bearing, however the disclosure herein is equally applicable to a one, three or other lobe bearing in which the spring foil and fluid foil comprise one, three or another number of segments.

With reference to the spring foil 120,130 depicted in FIG. 1, it will be observed that the retaining portions 160 of the spring foil will extend axially and radially outside the bore of the bushing 110 when inserted into the bore of the bushing 110.

The inner surface of the bore may define a bore axis, bore inner surface radius and oppositely disposed bore inner surface axial ends. The one or more retaining portions 160 may extend radially outside the bore inner surface radius and axially outside the bore inner surface axial ends, e.g. any one retaining portion may extend to a radius greater than the bore inner surface radius and may extend to an axis that is outside the axial region spanned by the bore inner surface axial ends. The retaining portions 160 may comprise axially oppositely disposed retaining portions that extend radially and axially outside the inner surface of the bore.

The spring foil offers a resilient support for the fluid foil, both prior to, and during, the spin-up phase of operation of the bearing and also during normal operation thereof. Thus force acting in a direction radially outwards from the rotor may be transferred via the spring foil to the bushing inner surface.

The fluid foil provides a surface for rotatably receiving a rotor and in use a thin rapidly moving fluid layer forms between the surface of the fluid foil and the rotor giving rise to a low friction environment within which the rotor can rotate. That the retaining portions extend outside the radial inner surface of the bore region including critical interacting surfaces serves to reduce performance dependence upon manufacturing specifics relating to the spring foil. The hydrodynamic nature of the fluid layer prevents excessive buildup of heat. Furthermore, relocating the retaining portions outside the critical interacting surface region facilitates increased control over the stiffness characteristics within the critical region by reducing interdependence between the stiffness characteristics within the critical region and the retention mechanism. These properties of the fluid foil radial bearing render the fluid foil radial bearing particularly suitable for use in high temperature high rotation applications such as in the case of micro turbines.

In the example provided in FIG. 1, retention members 170 and 180 fit within corresponding grooves 175 provided in the bushing 110 thereby to clamp the fluid foil segments following assembly.

Retaining portions 160 of the spring foil are arranged so as to extend axially and radially outside the inner surface of the bore of the bushing 110. In the example provided in FIG. 1, each spring foil segment 120 and 130 comprises a plurality of retaining portions disposed at axially opposite ends thereof.

Thus the spring foil may be provided with one or more retaining portions arranged to be disposed at each axial end of the bushing. By providing a spring foil with one or more retaining portions at axially opposite ends thereof, the spring foil can be slotted into the bushing 110 and the axially opposed sets of retaining portions protrude axially and radially outside the radially inner surface of the bushing 110 facilitating a secure fit therebetween and reducing the potential for axial displacement of the spring foil.

The bushing 110 may be provided with a seat 165 for receiving one or more of the retaining portions of the spring foil. The bushing may be provided with one or more seats for receiving the one or more retaining portions of the spring foil. The bushing may be provided with one or more seats at each axial end thereof.

Figure 2:
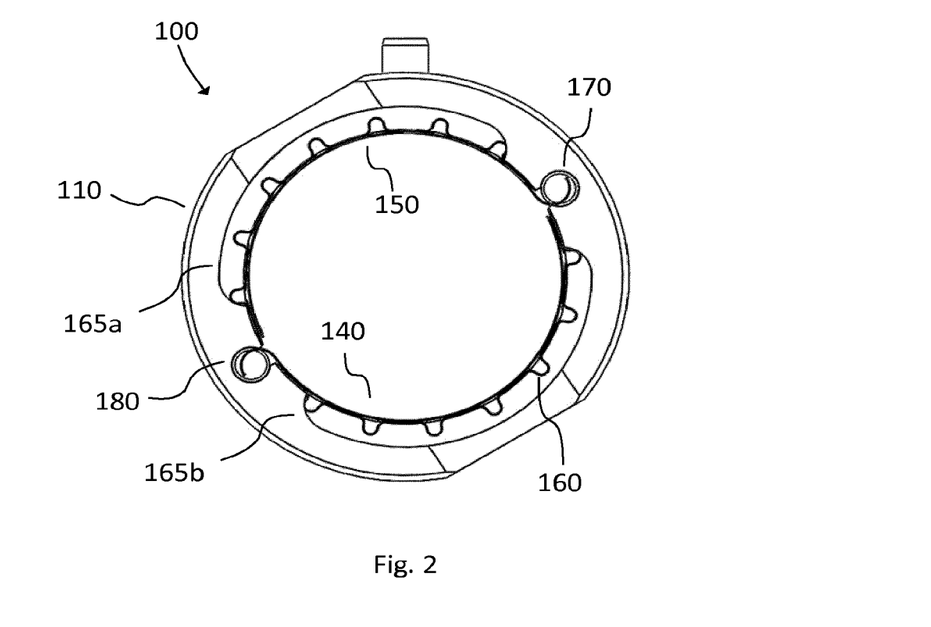
FIG. 2 depicts the example compliant foil radial bearing of FIG. 1 from a direction parallel to the axis of the bushing.

FIG. 2 provides a front view of a compliant foil radial bearing. As shown in this example, axially-oriented lengths of the fluid foil segments 140 and 150 are wrapped around the fluid foil retention members 170 and 180, which clamp the fluid foil segments 140 and 150 within the grooves 175 provided within the bushing 110.

In the example of FIG. 2, there are provided first 165a and second 165b seats for receiving retaining portions 160 associated with the first 140 and second 150 fluid foil segments.

As shown in FIG. 2, the retaining portions extend axially and radially outside the inner surface of the bore of the bushing 110.

By positioning the retaining portions of the spring foil axially and radially outside the inner surface of the bore of the bushing 110, there is facilitated a greatly simplified manufacturing of the bushing 110 since the retaining portions do not need to be supported by structural features of the inner surface of the bushing 110.

Furthermore, the positioning of the retaining portions outside the critical inner surface of the bore of the bushing 110 reduces the impact of the retention between the spring foil and bushing on performance of the bearing, which results in reduced sensitivity in respect of bearing performance upon manufacturing specifics.

Whilst the figures show the provision of a seat for receiving the retaining portions of the spring foil, the retention mechanism disclosed in the present application would equally apply in the case of a bushing provided without a seat. In this case the retaining portions would sit on the axial outside ends of the bushing.

Figure 3:
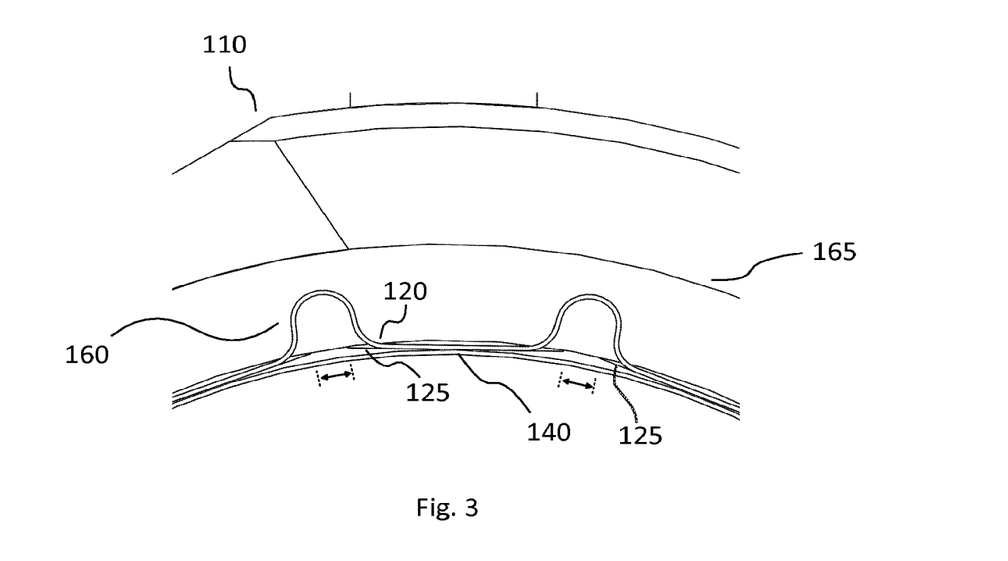
FIG. 3 depicts the interaction between the retaining portions and bushing in the example fluid foil radial bearing of FIG. 1.

FIG. 3 provides a close-up view of the interaction between the retention portions 160 of the spring foil and the bushing 110.

In the depicted example, the retaining portions are provided in the form of loops. The loops are arranged to extend radially outwards from the inner surface of the bore of the bushing 110. Providing the retaining portions in the form of loops has been shown to facilitate improved isolation between the retention mechanism and the critical surfaces within the bearing relating to performance.

Turning back to FIG. 1, in this example the spring foil comprises axially oriented strips. The strips may be arranged so as to be co-axially disposed with the axis of the bore. In the two segment example shown, first segment 120 comprises axial strips 125 and second segment 130 comprises axial strips 135.

FIG. 1 depicts a spring foil segment 120 comprising a plurality of strips 125 that are interconnected by retaining portions 160. Connecting strips 125 using the retaining portions 160 facilitates independent tunable stiffness and resilience of each strip.

An aspect of the stiffness and resilience facilitated by a spring foil comprising one or more strips will be explained in detail with reference to FIG. 3.

With the spring foil 120 conforming to the radially inner surface of the bore of the bushing 110, each strip contacts the radially inner surface of the bore of the bushing 110 at circumferentially opposing radially outer contact regions on the strips. In between these circumferentially opposing contact regions of the strips, fluid foil 140 contacts the radially inner surface of the strip of the spring foil 120. In this way, the strips may be considered as beams supported at the circumferentially opposing radially outer contact regions, with the fluid foil 140 deforming the beams in between the circumferentially opposing contact regions by contacting the strip at a radially inner surface thereof. The contact between each strip and bushing and each strip and the fluid foil may be axially oriented contact regions. These axially oriented contact regions may be line contacts or may be colinear point contacts along the axis. Such contact between the spring foil and fluid foil has been found to provide excellent bearing performance even at low revolutions per minute by increasing coulomb friction.

The above-described interconnection between the spring foil, bushing and fluid foil facilitates excellent bearing performance even at low revolutions per minute by providing optimal stiffness characteristics. Furthermore, the establishing of pin-to-pin beams in the strips for supporting the fluid foil offers the potential to vary the spring foil stiffness characteristic in the circumferential direction. This can be particularly advantageous mindful that owing to gravitational forces and other factors, loading in a fluid foil radial bearing tends to vary in a circumferential direction. This variation may be compensated for by varying the physical characteristics of the strips in a circumferential direction.

The strips may be curved in a circumferential direction. For example, the strips may be curved so as to present radially outwardly facing concavities. This may be synergistic with the above-described form of contact between the strip, fluid foil and bushing and facilitates greater control over the stiffness characteristics and the contact regions.

Figure 4A:
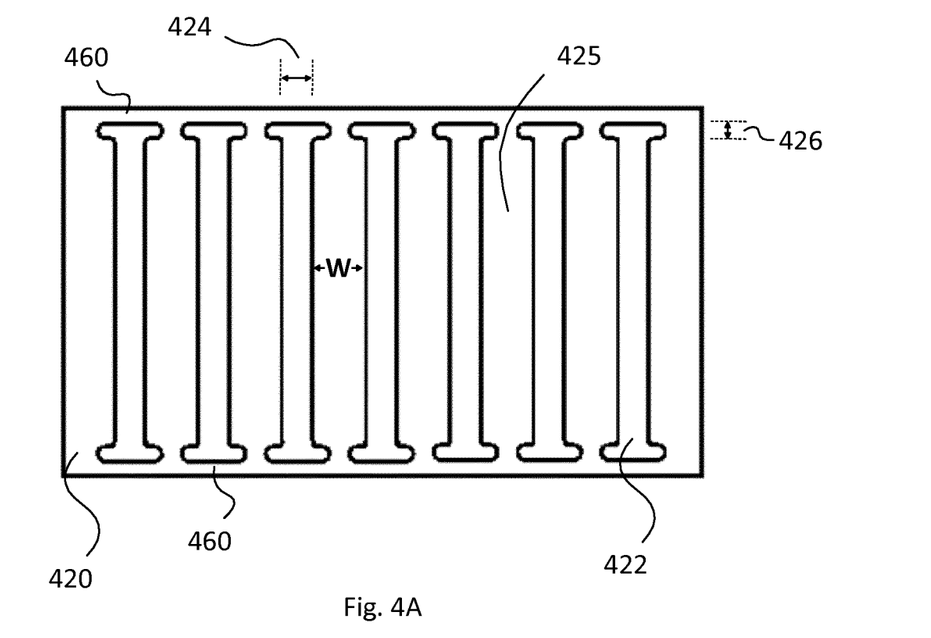
FIG. 4A depicts an example of a blank for forming a spring foil.

FIG. 4A depicts a blank 420 comprising sheet-metal having cutouts 422 from which the spring foil may be formed. In this example, there is provided a uniform spacing 424 between strips 425. This facilitates manufacturing simplicity. However, for the reasons outlined above, providing non-uniform spacing between strips can be advantageous, offering the potential to vary the resilience profile in a circumferential direction.

The spring foil 420 may comprise I-shaped cutouts 422, e.g. cutouts comprising portions for axial orientation with perpendicular cross bar portions 460 for circumferential orientation at each end thereof. The cross bar portions 460 may be arranged to be disposed at each axial end of the bushing. Forming I-shaped cutouts 422 offers a simplistic manufacturing method for forming a spring foil 420 having retaining portions at one or both ends of each I-shaped cutout, the retaining portions being arranged to be disposed axially and radially outwardly from the inner surface of the bore.

The bushing may be provided with a length (L) between 0.5 to 3 times a diameter (D) of the bore of the bushing, i.e. L/D=0.5 to 3, and the diameter (D) may set to be between 15 and 25 mm or between 20 to 23 mm. The ratio between a diameter of the bore of the bushing (D) and the circumferential width of each strip (W)—see indication of 'W' showing strip width in FIG. 4A, i.e. the width of each strip between first and second axially oriented ends thereof, may be set to be between 2 to 12, i.e. D/W=2 to 12. The strip width may be between 2 mm to 5 mm. Providing a strip width within this range has been found to provide optimal stiffness characteristics facilitating excellent bearing performance particularly for use of a compliant radial bearing within a microturbine. The thickness of the foil may be set to between 0.01 mm to 0.2 mm. It has been identified that the aforementioned dimensions provide an air bearing having excellent performance characteristics for a range of applications.

FIG. 4A depicts a spacing 426 between the strips and retaining portions 160. This spacing 426 may correspond with the axial width of the circumferentially disposed cutout portions. When assembled, this spacing 426 is axially oriented and improves isolation between the retention mechanism and the strips 425 located within the bore. Furthermore, independence between the loading characteristics of the strips 425 is improved.

Figure 4B:
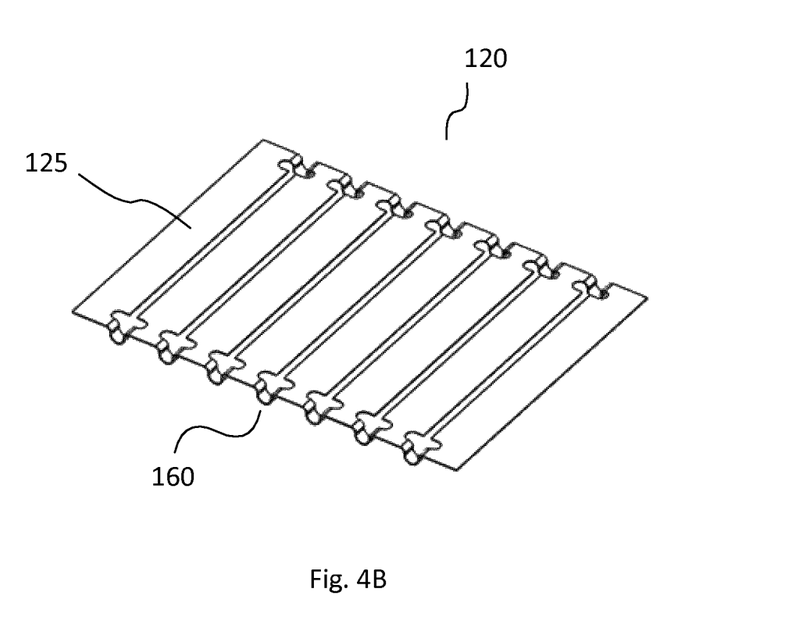
FIG. 4B depicts an example of a flat spring foil ready for insertion within a bushing.

FIG. 4B depicts a spring foil 120 formed from blank 420. The one or more retaining portions 160 have been formed at ends of the cutout portions in between strips 125 and are arranged so as to be disposed axially and radially outside the radially inner surface of the bushing upon insertion therein. The one or more retaining portions 160 may be formed in the blank 420 by forming out of plane bends or loops at one or both ends of the cutouts 422 arranged for axial orientation with the bushing.

FIG. 4B shows a spring foil 160 formed from sheet metal comprising I-shaped cutouts 422 and out of plane retaining portions 160 ready for insertion within a bushing. Such a spring foil facilitates significantly simplified manufacturing as compared to existing spring foil designs requiring complicated corrugation techniques, etc.

Figure 4C:
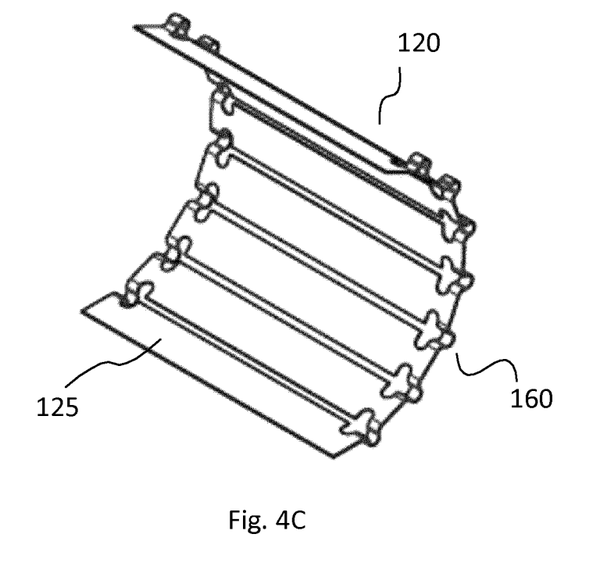
FIG. 4C depicts an example of a curved spring foil ready for insertion within a bushing.

Optionally, as shown in FIG. 4C, the substantially flat sheet metal may be curved in accordance with the shape of the radially inner surface of the bushing, prior to insertion within the bushing. Whilst omitting this step simplifies manufacturing, curving the flat sheet metal in this way during manufacturing of the spring foil facilitates reduced performance sensitivity to insertion of the spring foil within the bushing.

Figure 5:
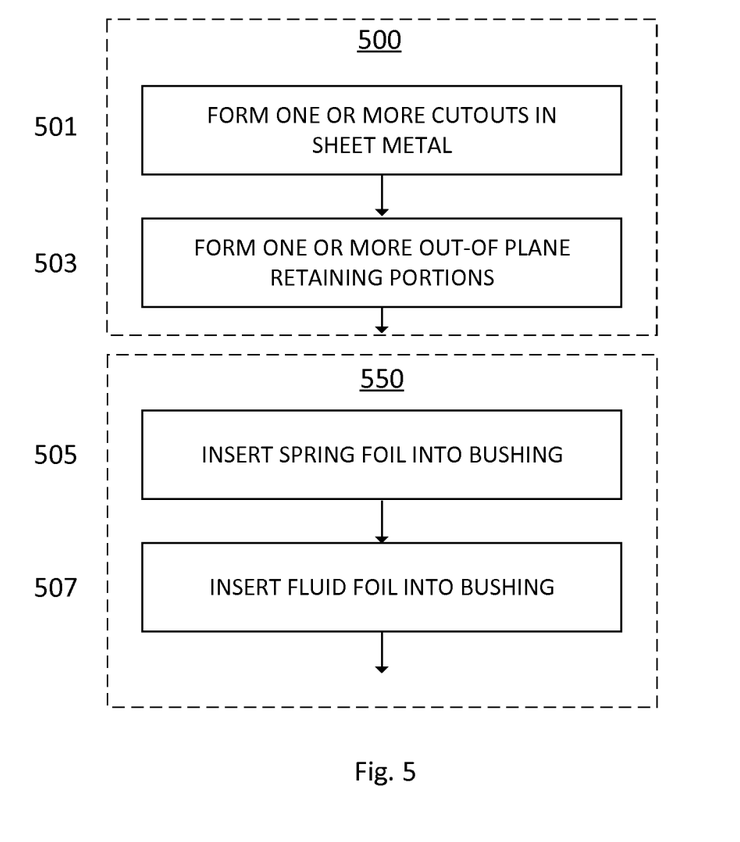
FIG. 5 depicts an example of a method of forming a spring foil and a method of forming a compliant foil radial bearing.

FIG. 5 shows an example method of forming a spring foil 500 comprising forming one or more cutouts in sheet metal 501, which may be I-shaped cutouts; forming one or more out of plane retaining portions 503, which may be disposed at one or both ends of each cutout. The cutouts may be arranged to extend in a direction parallel to the axis of the bushing upon insertion within the bushing. The one or more retaining portions may be arranged to be disposed axially outside the radially inner surface of the bushing upon insertion of the spring foil within a bushing.

FIG. 5 also shows an example method of forming a compliant radial bearing 550, which may be performed following the method of forming the spring foil 500, comprising the steps of: inserting the spring foil into the radially inner surface of the bushing 505; and inserting the fluid foil into the radially inner surface of the spring foil 507. Although not shown, the method may further comprise inserting one or more fluid foil retaining members within grooves of the bushing thereby to retain the fluid foil and optionally also the spring foil within the bushing.

Although not shown, a method of manufacturing the compliant radial bearing may comprise: forming one or more cutouts in sheet metal, e.g. as in FIG. 4A, inserting the sheet metal into a bushing; forming one or more retaining portions in the spring foil at axial end portions thereof. Thus the retaining portions may be formed once the sheet metal been inserted into the bushing.

Figure 6A:
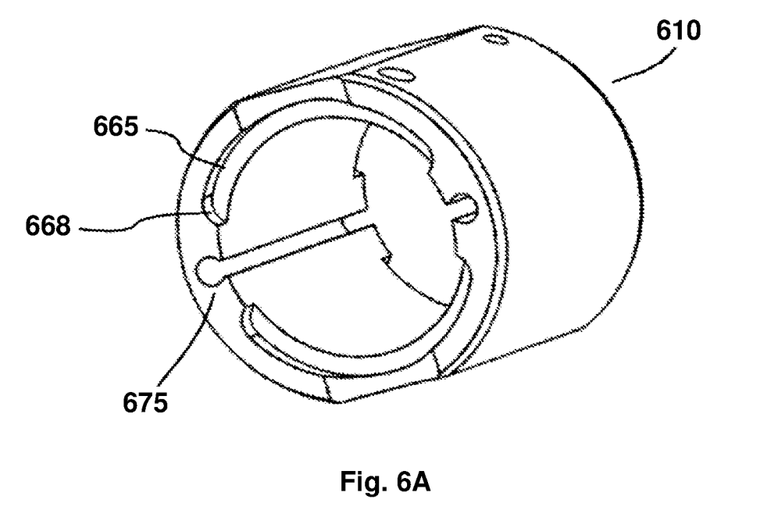
FIGS. 6A and 6B depict a first example of a bushing and spring foil for use therewith.
Figure 6B:
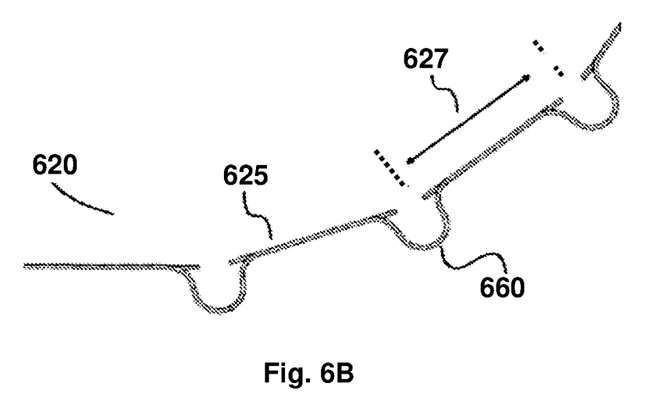

FIG. 6A depicts an example of a bushing 610 having circumferentially oppositely disposed seats 665 that provide stop surfaces 668 preventing rotation of the spring foil 620 of FIG. 6B by virtue of interaction between the retaining portions 660 of FIG. 6B of the spring foil 620 and the stop surfaces 668 of the seats 665. Bushing 610 has axially-oriented grooves 675 for receiving fluid foil retaining members therein.

The depicted examples of the bushing seats show seats that are located at a position axially inside of an axial end surface of the bushing. The bushing seats may be located at axial ends of the radial inner surface of the bushing and axially inside the axial end surfaces of the bushing. This prevents the retaining portions extending axially beyond the end surface of the bushing, improving handling characteristics of the bearing.

FIG. 6B depicts an example of a portion of a spring foil 620 suitable for use in the bushing of FIG. 6A. As shown, strips 625 are provided with a uniform circumferential length 627, facilitating manufacturing simplicity however a non-uniform circumferential length may be provided offering the capability to vary the loading characteristics of the spring foil in a circumferential direction.

Figure 7A:
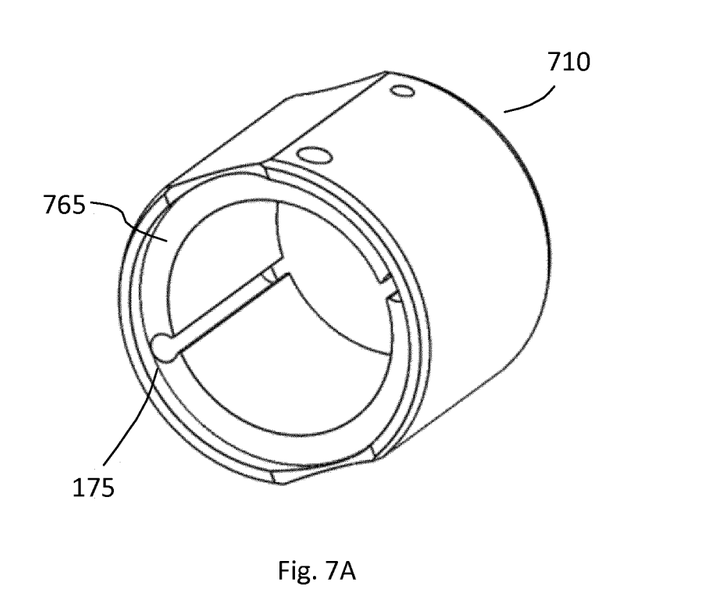
FIGS. 7A, 7B and 7C depict a second example of a bushing and alternative spring foils for use therewith.

FIG. 7A depicts an example of an alternative bushing 710 having seat 765 without stop surfaces. Rotation of the spring foil 720 is prevented by clamping an end clamping region 768 of the spring foil 720 using one or spring foil retaining members 170, 180. This arrangement facilitates reduced manufacturing complexity of the bushing.

Figure 7B:
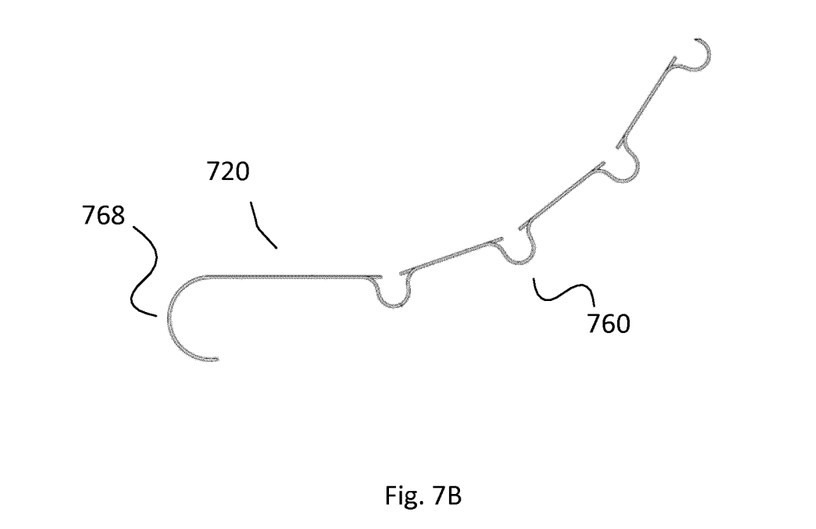

In the example of FIG. 7B, the spring foil is provided with an axially oriented clamping hook 768 at an end thereof to be received within an axially disposed groove 175 of the bushing 710 for receiving a retaining member, e.g. a fluid foil retaining member. In this way the spring foil can be prevented from rotation within the bushing using the one or more retaining members, which may be fluid foil retaining members used to clamp the fluid foil in place. Thus a retaining member may be provided for insertion into a groove for receiving the retaining member to secure the fluid foil and/or the spring foil.

FIG. 7B shows a spring foil 720 comprising retaining portions 760 and an axially oriented hook 768 comprising a radially outer concavity.

Figure 7C:
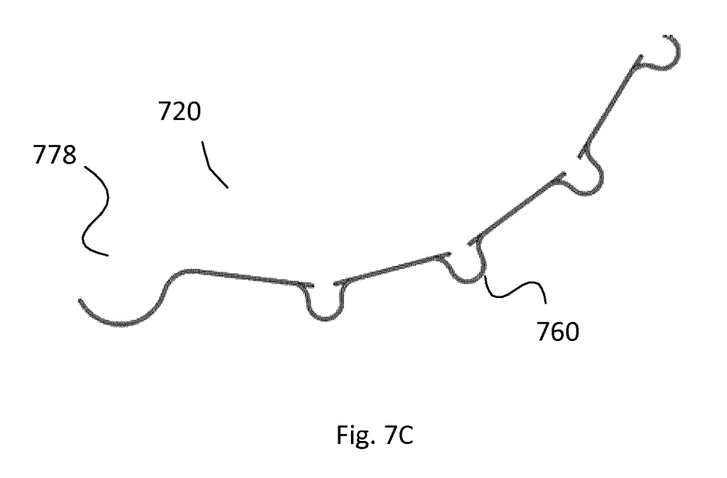

FIG. 7C shows a spring foil 720 having retaining portions 760 and an axially oriented hook 778 comprising a radially inner concavity.

Each of the examples disclosed herein, including the claimed examples, may be provided in a gas turbine system, e.g. a micro turbine system, comprising the fluid foil radial bearing according to any one example. Employing such a fluid foil radial bearing in a gas turbine system provides a gas turbine system offering improved management of frictional losses and heat It will be recognized that the examples disclosed herein are not limiting and are capable of numerous modifications and substitutions.

The invention claimed is:

1. A compliant foil radial bearing comprising:
a bushing comprising a bore defined therethrough;
a spring foil arranged to conform to a radially inner surface of the bore, wherein the spring foil comprises one or more axially oriented strips; and
a fluid foil arranged to conform to a radially inner surface of the spring foil for rotatably receiving a rotor, wherein:
the spring foil comprises one or more retaining portions arranged to extend axially and radially outside the radially inner surface of the bore, and
adjacent strips of the one or more axially oriented strips are coupled via the one or more retaining portions.

2. The compliant foil radial bearing according to claim 1, wherein:
the one or more retaining portions are provided in the form of loops.

3. The compliant foil radial bearing according to claim 1, wherein:
the one or more strips are curved in the circumferential direction.

4. The compliant foil radial bearing according to claim 1, wherein:
the one or more strips and fluid foil are arranged such that each strip contacts the radially inner surface of the bushing at first and second axially oriented bushing contact regions and contacts the fluid foil at an axially oriented fluid foil contact region in between the first and second axially oriented bushing contact regions.

5. The compliant foil radial bearing according to claim 1, wherein:
the ratio between a circumferential width of each strip and a diameter of the bore is between 2 to 12.

6. The compliant foil radial bearing according to claim 1, wherein:
the bushing comprises a seat for receiving one or more retaining portions of the spring foil.

7. The compliant foil radial bearing according to claim 6, wherein:
the seat is disposed axially inside an axial end surface of the bushing.

8. The compliant foil radial bearing according to claim 6, wherein:
the seat comprises one or more stop surfaces for preventing circumferential displacement of the spring foil.

9. The compliant foil radial bearing according to claim 1, wherein:
the spring foil comprises a first set and a second set of retaining portions at opposite axial ends thereof.

10. The compliant foil radial bearing according to claim 1, comprising:
one or more retention members arranged to fit within one or more corresponding grooves in the bushing, wherein:
the spring foil comprises one or more axially oriented retaining hooks arranged to wrap around the one or more retention members when inserted in the one or more corresponding grooves in the bushing.

11. The compliant foil radial bearing according to claim 1, wherein:
the spring foil comprises a first spring foil segment and a second spring foil segment.

12. A method of manufacturing a spring foil for a compliant foil radial bearing comprising a plurality of axially oriented strips and a plurality of retaining portions, the method comprising:
forming a spring foil from a sheet metal blank having I-shaped cutouts between each of the plurality of axially oriented strips,
wherein the I-shaped cutouts comprise portions for axial orientation with perpendicular cross bar portions for circumferential orientation at each end thereof,
wherein the cross bar portions are arranged at each axial end of the spring foil, and
wherein the sheet metal blank is bent to form a plurality of retaining portions at the ends of the I-shaped cutouts and the plurality of retaining portions have an axial width and extend radially outward from the spring foil.

13. The method according to claim 12, further comprising forming uniform spacing between the plurality of axially oriented strips.

14. A compliant foil radial bearing comprising:
a bushing comprising a bore defined therethrough;
a spring foil arranged to conform to a radially inner surface of the bore;
a fluid foil arranged to conform to a radially inner surface of the spring foil for rotatably receiving a rotor, wherein:
the spring foil comprises one or more retaining portions arranged to extend axially and radially outside the radially inner surface of the bore, and
the one or more retaining portions are provided in the form of loops.

15. The compliant foil radial bearing according to claim 14, wherein the spring foil comprises one or more axially oriented strips.

16. The compliant foil radial bearing according to claim 15, wherein adjacent strips of the one or more axially oriented strips are coupled via the one or more retaining portions.

17. The compliant foil radial bearing according to claim 14, wherein:
the one or more strips and fluid foil are arranged such that each strip contacts the radially inner surface of the bushing at first and second axially oriented bushing contact regions and contacts the fluid foil at an axially oriented fluid foil contact region in between the first and second axially oriented bushing contact regions.

18. The compliant foil radial bearing according to claim 14, wherein:
the ratio between a circumferential width of each strip and a diameter of the bore is between 2 to 12.

19. The compliant foil radial bearing according to claim 14, comprising:
one or more retention members arranged to fit within one or more corresponding grooves in the bushing, wherein:
the spring foil comprises one or more axially oriented retaining hooks arranged to wrap around the one or more retention members when inserted in the one or more corresponding grooves in the bushing.

* * * * *